May 2, 1967  A. C. BROWN  3,317,221
PIPE JOINTS

Filed Aug. 25, 1964  2 Sheets-Sheet 2

INVENTOR.
ANTHONY CECIL BROWN
By Fred Felman
agent

United States Patent Office 3,317,221
Patented May 2, 1967

3,317,221
PIPE JOINTS
Anthony Cecil Brown, Bearley, near Stratford-on-Avon, England, assignor to Birwelco Limited, Birmingham, England, a British company
Filed Aug. 25, 1964, Ser. No. 391,923
Claims priority, application Great Britain, Aug. 29, 1963, 34,147/63
2 Claims. (Cl. 285—39)

This invention relates to pipe joints. More particularly the invention is concerned with pipe joints between jacketted pipes, that is to say between the ends of two pipe assemblies each of which comprises an inner pipe mounted within an outer pipe to leave an annular space between the pipes. Pipe joints between such assemblies are hereinafter referred to as being "of the type described."

Pipe joints of the type described find application, inter alia, in single-tube heat exchangers in which there are provided legs of jacketted pipes and these legs are divided into longitudinal sections. Another application of pipe joints of the type described is in a pipe line carrying e.g. a viscous liquid in the inner pipe and a heating medium in the outer pipe.

Many previous proposals have been made for pipe joints of the type described but it is an object of the invention to provide such a pipe joint which is particularly useful at very high pressures, e.g. greater than 5000 p.s.i.g. and wherein the joint between the inner pipes can be tightened without dismantling the whole joint.

According to the invention a pipe joint between two pipe assemblies, each assembly comprising an outer pipe and an inner pipe mounted within the outer pipe to leave an annular space between the pipes, comprises a sleeve member whose bore has internally threaded end portions of opposite hand and which receives complementary threaded end portions of said inner pipes; a ring seal in said bore interposed between, and in sealing engagement with, the ends of said inner pipes; external flanges on adjacent ends of the outer pipe; an external flange on the sleeve member interposed between said outer pipe flanges and having formations on the outer periphery thereof for engagement by a spanner; sealing gaskets interposed between the flanges on the sleeve member and the flanges on the outer pipes; a ring of bolts passing through and connecting the flanges on the outer pipes to draw them together and to compress the sealing gaskets, said flange on the sleeve member lying wholly within said ring; and passages in the flange of the sleeve member to place the annular spaces of the two pipe assemblies in communication.

Figure 1:
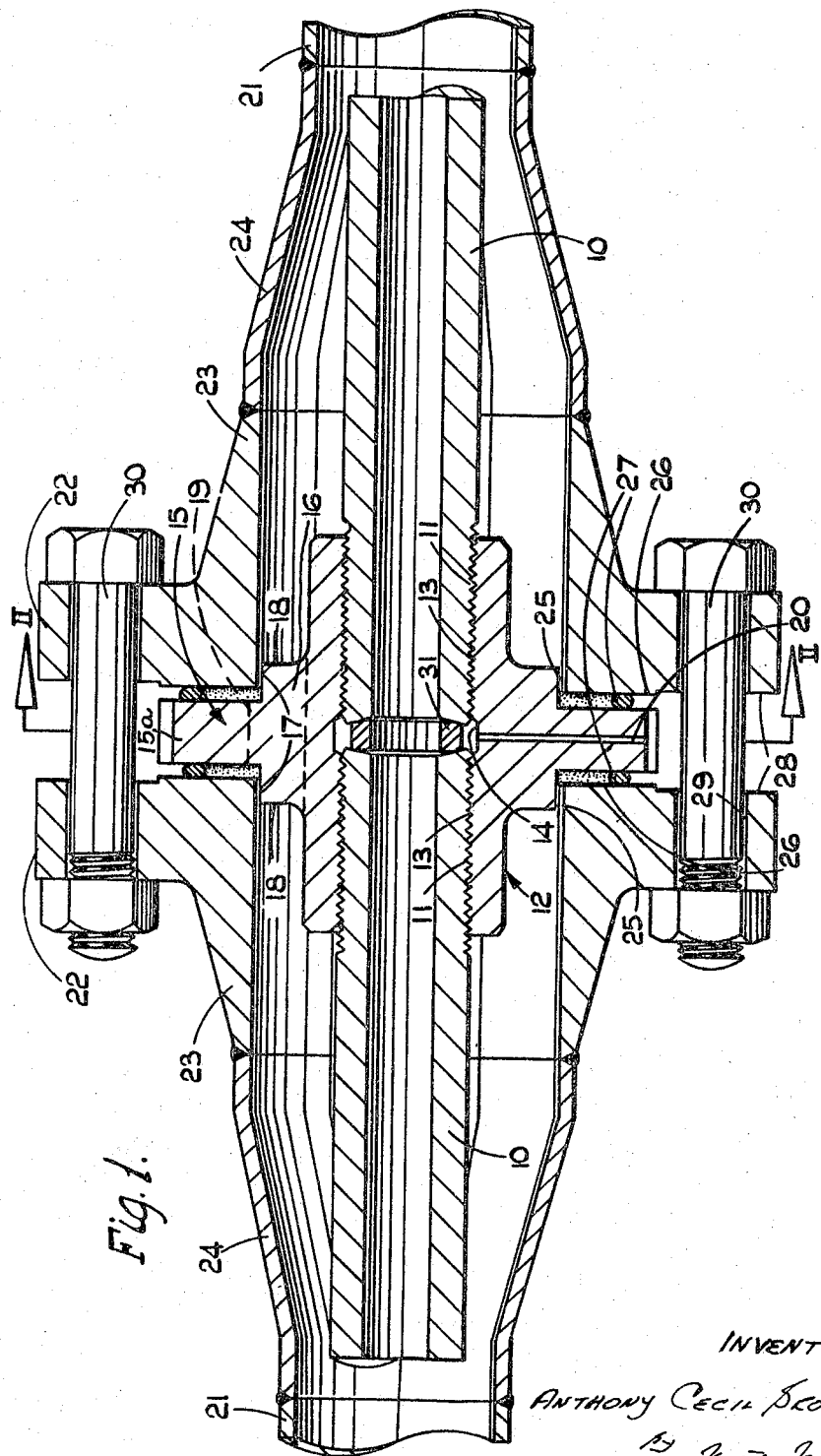
Figure 2:
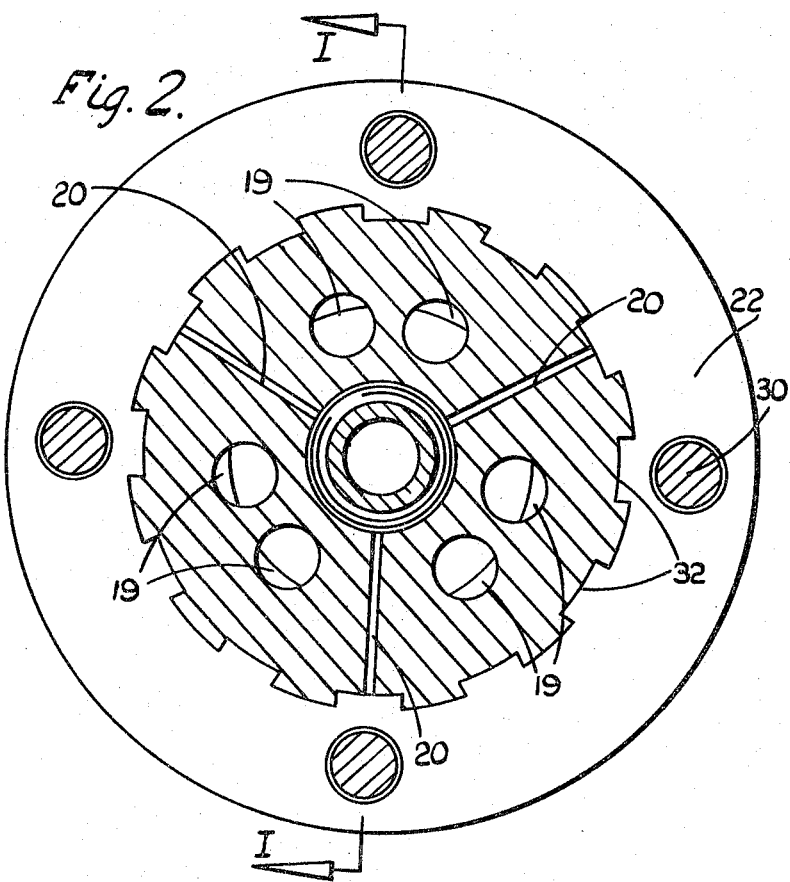

An embodiment of the invention will now be described in detail by way of example with reference to the accompanying drawings, in which:

FIGURE 1 is a section through a jacketted pipe joint embodying the invention; and
FIGURE 2 is a section on the line II—II of FIGURE 1.

Referring now to the drawings, the ends of inner pipes 10 are provided with external screw threads 11. The threaded ends of the pipes 10 are introduced into a sleeve member 12 whose opposite ends present internal threaded bores 13 of different hand whereby turning of the sleeve member 12 relative to the inner pipes 10 will move both pipes either towards one another or away from one another depending on the direction of relative rotation. The sleeve member 12 is provided between the threaded bores 13 with an internal circumferential channel 14 for a purpose hereinafter to be described. The sleeve member is also provided with an external flange 15 which has a thinner outer portion 15a and a thicker inner portion 16, the transition between the portions providing a pair of axial shoulders 17 and the portion 16 presenting a pair of radial shoulders 18. The axial shoulders 17 are used for centering the sleeve member in the joint as will hereinafter be described. Axial passages 19 are provided through the flange of the sleeve member and these passages also extend through the axial and radial shoulders 17 and 18 as shown in FIGURE 1. Conveniently as shown in FIGURE 2 six such passages 19 are provided arranged in pairs around the axis of the sleeve member. Between each pair of axial passages is a small diameter radial passage 20 which extends from the outer periphery of the flange 15 to the channel 14 between the threaded bores of the sleeve member; there are thus three such radial passages.

The ends of the outer pipes 21 are provided with external flanges 22. Each external flange 22 is formed with an integral pipe portion 23 which is of larger diameter than the main part of the outer pipe and reducers 24 are welded between the pipe portions 23 and the main portions of the outer pipes 21. The flanges 22 on the outer pipes are provided with internal surfaces 25 which co-operate with the axial shoulders 17 on the external flange of the sleeve member and serve to centre the sleeve member when the pipe joint is assembled. The external flange 15 of the sleeve member is clamped between inner circumferential portions 26 of the flanges 22 on the outer pipes. Sealing gaskets 27 are interposed between the sealing face of each flange 22 and the adjacent face of the external flange 15. Conveniently, and as shown, such gaskets 27 may be in the form of O-ring seals having elliptical cross-sections. The outer peripheral portions 28 of the sealing faces of the flanges 22 are relieved slightly relative to the inner peripheral portions 26 and are drilled at 29 to receive a series or ring of bolts 30 whereby the flanges 22 can be brought together.

A lens-ring seal 31 is interposed between the ends of the inner pipes 10 within the sleeve member 12 and the seal 31 is compressed as the inner pipes are screwed into the sleeve member and forms a seal between said ends. Any fluid from the joint between the ends of the inner pipes leaking past the lens-ring seal 31 will pass into the channel 14 and from thence along one of the radial passages 20 so that any leakage can be detected from outside the joint. If desired the outer ends of the passages 20 may be provided with check valves which operate in response to build-up of pressure in the passages and indicate leakage by their operation.

The method of assembly is as follows, the two pipe assemblies, each comprising an inner pipe 10 and an outer pipe 21 with its reducer 24 and flange 22, are brought into alignment and the sleeve member 12 is interposed between the ends of the inner pipes 10 with the lens-ring seal 31 located within the sleeve member and centrally thereof. To assist in holding the lens-ring seal in a desired position, access can be had to this seal through the radial passages 20. The sleeve member is then turned in an appropriate direction to bring the threaded ends of the inner pipes towards one another within the sleeve member and this rotary movement is continued until the ends of the inner pipes are in sealing relation with the lens-ring seal 31. The tightening may be done by means of a C-spanner engaging in formations 32 provided on the outer periphery of the flange of the sleeve member. In an alternative arrangement, not shown, the external periphery of the flange 15 could be made hexagonal or of other shape to be engaged by a conventional or special spanner to turn the sleeve member.

After the ends of the inner pipes have been mutually sealed, the bolts 30 are passed through the apertures 29 in the flanges 22 and are tightened so that the flanges 22 approach one another and the external flange of the sleeve member. Prior to insertion of the bolts, the O-ring seals 27 are inserted between the sealing faces of the flanges 22 and the opposed faces of the external flange 15. Tightening of the bolts 30 will nip the O-ring seals 27 between the flanges and the joint will be complete.

When the joint has been completed, fluid can flow through the inner pipes 10 and through the centre of the seal 31. Any fluid leaking from the inner pipe joint past the seal 31 will drain through one of the radial passages 20 and may be observed from outside the joint. Moreover, fluid passing through the annular spaces between each pair of pipes 10, 21 can pass through the passages 19 in the external flange 15 of the sleeve member so that there is an uninterrupted flow of fluid through both inner and outer pipes, the two flows of fluid being always in heat-exchange relation.

Features of the above-described pipe joint are as follows:

(a) The joint between the ends of the inner pipes is made by a sealing gasket and threads on the pipe ends are spaced from the sealing faces of the pipe ends so that no welding, brazing or soldering of the thread ends is necessary.

(b) The sealing of the ends of the inner pipes can be effected while the outer pipes and flanges are in position since the external flange on the sleeve member may be turned by a spanner or the like between the flanges on the outer pipes. It is then only necessary to remove one or more of the flange bolts on the outer pipes to effect tightening of the joint between the inner pipes if leakage occurs in service since the flange on the sleeve member lies wholly within the ring of bolts 30.

(c) The provision of the radial passages in the sleeve member allows the monitoring of any leakage which occurs from the joint between the ends of the inner pipes. The radial passages can be so arranged that at least one would always be visible to an observer inspecting the joint.

(d) The provision of centering shoulders on the external flange of the sleeve member prevents bending torque being applied to the inner pipes during tightening if the flanges on the outer pipes are supported. Moreover, the shoulders ensure centering of the inner pipes within the joint and therefore, where required, equal heating or cooling between the two fluids passing through the joint or around the joint.

(e) The joint is susceptible of assembly within a fitting-up rig which would permit very accurate assembly with extreme axial loading and without introducing stray bending or other unknown forces.

(f) The joint is extremely useful in connection with fluids which are being transported at very high pressures.

What I then claim is:

1. A pipe joint between two pipe assemblies, each assembly comprising an outer pipe and an inner pipe mounted within the outer pipe to leave an annular space between the pipes, the joint comprising a sleeve member whose bore has internally threaded end portions of opposite hand and which receives complementary threaded end portions of said inner pipes; a ring seal in said bore interposed between, and in sealing engagement with, the ends of said inner pipes; external flanges on adjacent ends of the outer pipe; an external flange on the sleeve member interposed between said outer pipe flanges and having formations on the outer periphery thereof for engagement by a spanner; sealing gaskets interposed between the flange on the sleeve member and the flanges on the outer pipes; a ring of bolts passing through and connecting the flanges on the outer pipes to draw them together and to compress the sealing gaskets, said flange on the sleeve member lying wholly within said ring, and passages in the flange of the sleeve member to place the annular spaces of the two pipe assemblies in communication.

2. A pipe joint according to claim 1 wherein the external flange on the sleeve member has an outer portion which is interposed between the flanges on said outer pipes and an inner portion within the outer pipes and being provided with said passages, the outer portion being thinner than the inner portion to provide axial shoulders at the transition between the portions, the shoulders engaging within the outer pipes to centre the sleeve member therein.

References Cited by the Examiner
UNITED STATES PATENTS

| | | | |
|---|---|---|---|
| 504,871 | 9/1893 | Forsyth | 285—138 |
| 1,160,703 | 11/1915 | Fleming | 285—133 |
| 1,812,471 | 6/1931 | Cater | 285—133 |
| 2,565,744 | 8/1951 | Sinclair | 285—133 |
| 3,109,671 | 11/1963 | Braun | 285—47 |

FOREIGN PATENTS

| | | |
|---|---|---|
| 224,404 | 11/1962 | Austria. |
| 228,017 | 6/1963 | Austria. |
| 786,299 | 5/1935 | France. |
| 795,459 | 1/1936 | France. |
| 487,863 | 6/1938 | Great Britain. |
| 757,337 | 9/1956 | Great Britain. |
| 908,926 | 10/1962 | Great Britain. |

CARL W. TOMLIN, *Primary Examiner.*

R. GIANGIORGI, D. W. AROLA, *Assistant Examiners.*